United States Patent
Gafni et al.

(10) Patent No.: US 12,481,440 B2
(45) Date of Patent: *Nov. 25, 2025

(54) DYNAMICALLY RESERVED RESOURCE ALLOCATION

(71) Applicant: Mellanox Technologies, LTD., Yokneam (IL)

(72) Inventors: Barak Gafni, Sunnyvale, CA (US); Aviv Kfir, Nili (IL)

(73) Assignee: Mellanox Technologies, LTD., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/753,238

(22) Filed: Jun. 25, 2024

(65) Prior Publication Data

US 2024/0345748 A1     Oct. 17, 2024

Related U.S. Application Data

(63) Continuation of application No. 17/244,579, filed on Apr. 29, 2021, now Pat. No. 12,050,791.

(51) Int. Cl.
*G06F 3/06* (2006.01)
*H04L 12/70* (2013.01)

(52) U.S. Cl.
CPC .......... *G06F 3/0631* (2013.01); *G06F 3/0604* (2013.01); *G06F 3/067* (2013.01); *H04L 2012/5631* (2013.01)

(58) Field of Classification Search
CPC ....... G06F 3/0631; G06F 3/0604; G06F 3/067
USPC .......................................................... 711/154
See application file for complete search history.

(56) References Cited

U.S. PATENT DOCUMENTS

| | | | |
|---|---|---|---|
| 8,341,624 B1 * | 12/2012 | Hobbs | H04N 19/152 718/1 |
| 9,479,457 B2 * | 10/2016 | Sindhu | H04L 49/10 |
| 9,621,425 B2 * | 4/2017 | Zhang | H04L 41/0897 |
| 12,050,791 B2 | 7/2024 | Gafni et al. | |
| 2016/0249079 A1 | 8/2016 | Malone et al. | |
| 2020/0065161 A1 * | 2/2020 | Sanghi | G06F 9/542 |
| 2020/0154397 A1 * | 5/2020 | Kim | H04W 72/02 |
| 2022/0007378 A1 * | 1/2022 | Basu Mallick | H04L 5/001 |

OTHER PUBLICATIONS

Official Action for U.S. Appl. No. 17/244,579, dated Oct. 31, 2023 21 pages.
Notice of Allowance for U.S. Appl. No. 17/244,579, dated Apr. 10, 2024 11 pages.

* cited by examiner

*Primary Examiner* — Faruk Hamza
*Assistant Examiner* — Jean F Voltaire
(74) *Attorney, Agent, or Firm* — Sheridan Ross P.C.

(57) ABSTRACT

Devices, methods, and systems are provided. In one example, a device is described to include a bandwidth-constrained resource and a controller that dynamically allocates a proportional consumption of storage to the bandwidth-constrained resource thereby enabling the bandwidth-constrained resource to provide bandwidth to a consuming entity. The controller may allocate the proportional consumption of the storage to the bandwidth-constrained resource based on a current state of the bandwidth-constrained resource.

20 Claims, 6 Drawing Sheets

FIG. 6

DYNAMICALLY RESERVED RESOURCE ALLOCATION

CROSS REFERENCE TO RELATED APPLICATIONS

This application is a continuation of U.S. patent application Ser. No. 17/244,579, filed Apr. 29, 2021, the disclosure of which is hereby incorporated by reference, in its entirety, for all that it teaches and for all purposes.

FIELD OF THE DISCLOSURE

The present disclosure is generally directed toward networking devices and, in particular, toward allocating storage to enable functionality of networking devices.

BACKGROUND

Bandwidth management is often performed in routers or switches to avoid filling a communication link to capacity or overfilling the link. Filling or overfilling a communication link may result in network congestion, poor performance, packet delays, or packet loss. Especially in cloud architectures, the need for timely and reliable packet transmission is paramount.

BRIEF SUMMARY

While it is possible to design networking devices to support anticipated bandwidth requirements, there are additional considerations as play. For example, a networking device that supports higher bandwidth capabilities will be substantially more expensive to produce and operate than other networking devices. Furthermore, if a networking device is designed to accommodate anticipated peaks in network traffic, then there may be many times where the networking device is not fully utilized.

Embodiments of the present disclosure aim to solve the problems associated with allocation of a reserved resource (e.g., buffer, port, Central Processing Unit (CPU), Graphics Processing Unit (GPU), etc.) for a particular networking or application entity. Examples of entities that may wish to reserve resources include a network tenant, an application, a tuple, etc. In some situations it is desirable to allow resource sharing between entities by pooling resources and then intelligently allocating the pool of resources among the entities. Under some allocation approaches, the total pool of usable resources may be dynamically allocated, although the reserved amount of resources in a pool is static. The reserved amount is currently determined by the unit of Bytes (e.g., in the case of a buffer resource).

Embodiments described herein enable a reserved allocation of storage (e.g., buffer storage) under a current state of resource allocation that determines the total amount of reachable resources. This reservation can be determined by percentage, rather than by Bytes (e.g., in the case of buffer resources). As an example, embodiments described herein enable new types of buffer management, when the buffer is allocated in the context of a port or a queue, for example allocating minimum buffer allocation for a tenant or 5-tuple related to a particular queue.

On top of enabling the allocation of reachable resources for a flexible entity (e.g., a tenant, application, or 5-tuple) which bound the amount of resources from the top, or allocating these resources as a constant value, embodiments described herein enable these entities to have a minimum amount of resources under a dynamic resource which are determined (e.g., configured) using a relative value such as percentage or the like.

Embodiments described herein enable buffer reservation for a flow which is related to the occupancy of the dynamic resource to which it belongs. With dynamic resource allocation, an amount of bandwidth can be allocated for a flow within the context which is served by the resource. For example, if the resource belongs to a port and 10% of the port is allocated to flow a first entity (e.g., entity A), the resource allocation controller described herein can ensure that the first entity will get 10% of the port's bandwidth when bandwidth is required. This approach enables bandwidth reservation without the immediate allocation of queues, which simplifies and reduces the cost of bandwidth reservation in general.

As will be described in further detail herein, an aspect of the present disclosure is to control the allocation of bandwidth on a bandwidth-constrained resource (or multiple resources) by putting a constraint on storage (e.g., buffer storage), which is not necessarily bandwidth constrained. The constraint on the storage can be measured as a percentage, which makes its absolute values dynamic, as the overall storage allocation for say the port or queue may change over time (e.g., as the port or queue is using a part of the overall memory of the whole storage provided by a networking device).

A beneficial effect of following the allocation approaches described herein is that allocation of bandwidth in a bandwidth-constrained resource (e.g., a port, queue, CPU, GPU, etc.) can be assured within the overall system by allocating the bandwidth-constrained resource a percentage of storage space from a higher-level entity (e.g., buffer storage).

Buffer allocation to facilitate bandwidth availability is an illustrative issue solved by embodiments described herein; however, the proposed solutions can be leveraged for other types of dynamic resource allocation tasks.

In an illustrative example, a networking device is disclosed that includes: a bandwidth-constrained resource and a controller that dynamically allocates a proportional consumption of storage to the bandwidth-constrained resource thereby enabling the bandwidth-constrained resource to provide bandwidth to a consuming entity, where the controller allocates the proportional consumption of the storage to the bandwidth-constrained resource based on a current state of the bandwidth-constrained resource.

In another example, a method is disclosed that includes: determining a proportional value of a bandwidth-constrained resource to allocate to a consuming entity; determining a current state of the bandwidth-constrained resource; determining, based on the proportional value and the current state, a proportional consumption of storage to allocate to the bandwidth-constrained resource; and dynamically allocating storage to the bandwidth-constrained resource based on determining the proportional consumption of the storage to allocate to the bandwidth-constrained resource.

In yet another example, a system is disclosed that includes: a processor and a computer memory device coupled with the processor, wherein the computer memory device comprises data stored thereon that enables the processor to: determine a current state of a bandwidth-constrained resource and allocate a proportional consumption of storage to the bandwidth-constrained resource thereby enabling the bandwidth-constrained resource to provide bandwidth to a consuming entity, where the proportional consumption of the storage is allocated to the bandwidth-constrained resource based on the current state of the bandwidth-constrained resource.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a Printed Circuit Board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means: A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-6, various systems and methods for enabling storage buffer reservation will be described. Among other things, embodiments of the present disclosure enable bandwidth reservation without the allocation of queues or ports, which simplifies and reduces the costs of bandwidth reservation.

Figure 1:
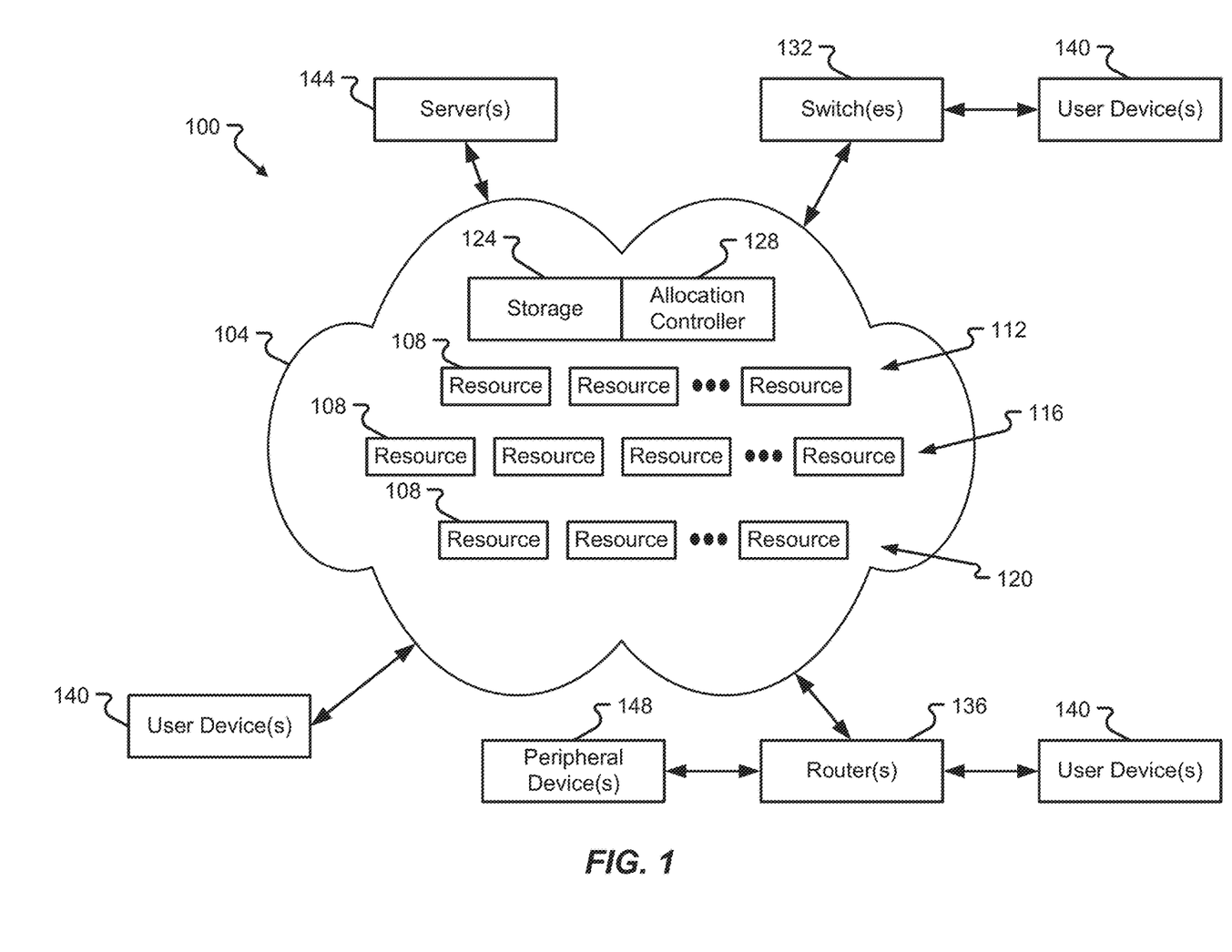
FIG. 1 is a block diagram illustrating a computing system in accordance with at least some embodiments of the present disclosure.

Referring initially to FIGS. 1, an illustrative computing system 100 is shown in which a network 104 is provided with connectivity to a number of user devices 140, servers 144, peripheral devices 148, and other computational devices. The network 104 may correspond to a cloud computing network or cloud architecture in which a plurality of resources 108 are used to provide cloud computing capabilities to the user devices 140, servers 144, peripheral devices 148, and/or other computational devices. Some devices (e.g., user devices 140) may connect directly to the network 104 whereas other devices may connect to the network 104 via a switch 132 and/or router 136. In some embodiments, a user device 140 may be configured to connect to the network 104 via one or both of a switch 132 and router 136.

The resources 108 provided in the network 104 may include any number of cloud computing resources. As will be discussed in further detail herein, some of the resources 108 may correspond to bandwidth-constrained resources 108 which provide an amount of bandwidth (e.g., communication capabilities, packet transmission, etc.) to user devices 140, servers 144, peripheral devices 148, and other computational devices connected to the network 104. Specific, but non-limiting, examples of a bandwidth-constrained resource 108 include a queue, port, CPU, GPU, or the like. A bandwidth-constrained resource 108 may be configured to utilize some amount of storage 124 to provide bandwidth to devices connected to the network 104. In some embodiments, a bandwidth-constrained resource 108 may provide bandwidth to a consuming entity (e.g., a tenant, application, 5-tuple, etc.) that has subscribed to the network 104 and is paying for a certain amount of resources 108 from the network 104. As an example, a bandwidth consuming entity may request (and potentially pay for or subscribe to) a particular amount of bandwidth from the network 104. The bandwidth of the network 104 may be made available to the consuming entity through allocation of one or more resources 108. However, as will be described in further detail herein, one or more of the resources 108 may be configured to have some amount of storage 124 allocated thereto by a storage allocation controller 128. The allocation controller 128 may provide as a central component that monitors a state of some or all resources 108, monitors an amount of the storage 124 that is currently allocated to resources 108, determines if additional storage 124 is available for allocation to resources 108, and dynamically updates allocation(s) of the storage 124 among the resources 108 to provide bandwidth to a consuming entity.

Illustratively, and without limitation, resources 108 may include application-level resources 112, platform-level resources 116, and/or infrastructure resources 120. More specific, but non-limiting, examples of application-level resources 112 include resources 108 that are configured to monitor user actions or activities, resources 108 that are configured to provide content, resources 108 that are configured to enable collaboration, resources 108 that are configured to enable communication, and combinations thereof. In some embodiments, one or more resources 108 that are application-level resources 112 may be configured to have an amount of storage 124 allocated thereto by the allocation controller 128 to enable the resources 108 to provide bandwidth to a consuming entity.

More specific, but non-limiting, examples of platform-level resources 116 include resources 108 that are configured to provide object storage, resources 108 that are configured to enable identity/authentication capabilities, resources 108 that enable runtime processes to occur, queue resources 108, port resources 108, processing resources 108, database resources 108, and combinations thereof. In some embodiments, one or more resources 108 that are platform-level resources 116 may be configured to have an amount of storage 124 allocated thereto by the allocation controller 128 to enable the resources 108 to provide bandwidth to a consuming entity.

More specific, but non-limiting, examples of infrastructure-level resources 120 include compute resources 108, storage resources 108, and/or network resources 108. In some embodiments, one or more resources 108 that are infrastructure-level resources 120 may be configured to have an amount of storage 124 allocated thereto by the allocation controller 128 to enable the resources 108 to provide bandwidth to a consuming entity.

Although depicted as separate components, it should be appreciated that two or more resources 108 may be provided in a common device, mounted on a common PCB, mounted on a common substrate, contained in a common housing, or provided within a common form factor. It may also be possible that none of the resources 108 are provided in a common device, but rather each resource 108 may be provided in a different device. As some non-limiting examples, resources 108 may be provided in a networking device and/or computational device such as a switch, a Network Interface Card (NIC), a CPU, a GPU, a Network Address Translator (NAT) device, a network edge device, a firewall, a router, or the like. Some resources 108 may be shared between consuming entities (e.g., two or more tenants, two or more applications, or two or more 5-tuples) whereas other resources 108 may be dedicated to a single consuming entity. Some resources 108 may correspond to physical resources whereas other resources 108 may correspond to virtualized or containerized resources.

The storage 124 may correspond to one or multiple computer memory devices. Examples of storage 124 will be described in relation to buffer storage, but it should be appreciated that other memory types may be used as storage 124 and may be intelligently allocated by the allocation controller 128 among one or multiple consuming entities. One example of storage 124 is buffer storage, which may also be referred to as buffer memory. Other examples of memory devices that may be used as storage 124 include, without limitation, Random Access Memory (RAM), Read Only Memory (ROM), flash memory, Electronically-Erasable Programmable ROM (EEPROM), Dynamic RAM (DRAM), combinations thereof, and the like.

The allocation controller 128 may include a processor and memory coupled to the processor. The memory of the allocation controller 128 may include instructions that are executable by the processor the allocation controller 128 and that, when executed, enable the processor of the allocation controller 128 to perform the various functions of the allocation controller 128 described herein. For instance, the allocation controller 128 may determine amounts of bandwidth to allocate to consuming entities, determine state(s) of resources 108, determine proportional values of resources 108 to allocate to a consuming entity, determine an appropriate amount of the storage 124 to allocate to the resources 108 to enable the bandwidth to be provided to a consuming entity, and so on. The allocation controller 128 may be co-located with the storage 124 (e.g., contained within the same device as the storage 124) or may be located remotely from the storage 124 (e.g., provided on a different device from storage 124). Logic of the allocation controller 128 may be centralized (e.g., contained in a single memory device and executed by a single processor) or may be distributed (e.g., contained in multiple memory devices and/or executed by multiple processors).

Examples of suitable processors or processing units that may be used to implement the allocation controller 128 include, without limitation, a microprocessor, an Integrated Circuit (IC) chip, a Field Programmable Gate Array (FPGA), a number of microprocessors, a CPU, a GPU, etc. Examples of suitable memory that may be used for the allocation controller 128 include, without limitation, RAM, ROM, flash memory, EEPROM, DRAM, combinations thereof, and the like. Furthermore, while functionality of the allocation controller 128 is described in connection with a processor executing instructions stored in memory, it may be possible to implement some or all of the allocation controller 128 using machine learning models, artificial neural networks, deep neural networks, or the like.

The user device(s) 140, server(s) 144, and/or peripheral device(s) 148 may be owned/operated/controlled by a single consuming entity or may be owned/operated/controlled by different consuming entities. As an example, all of the user devices 140 may be associated with a single consuming entity. As another example, some of the user devices 140 may be associated with a first consuming entity whereas other user devices 140 may be associated with a second consuming entity. The user device(s) 140, server(s) 144, and/or peripheral device(s) 148 may connect with the network 104 using any number of communication protocols, communication media, communication links, and the like. When accessing the network 104 or components thereof, the computational devices may require a certain amount of bandwidth from one or more of the resources 108. The bandwidth made available by the resources 108 may be facilitated, at least in part, by allocating some amount of storage 124 to the resources 108.

Figure 2:
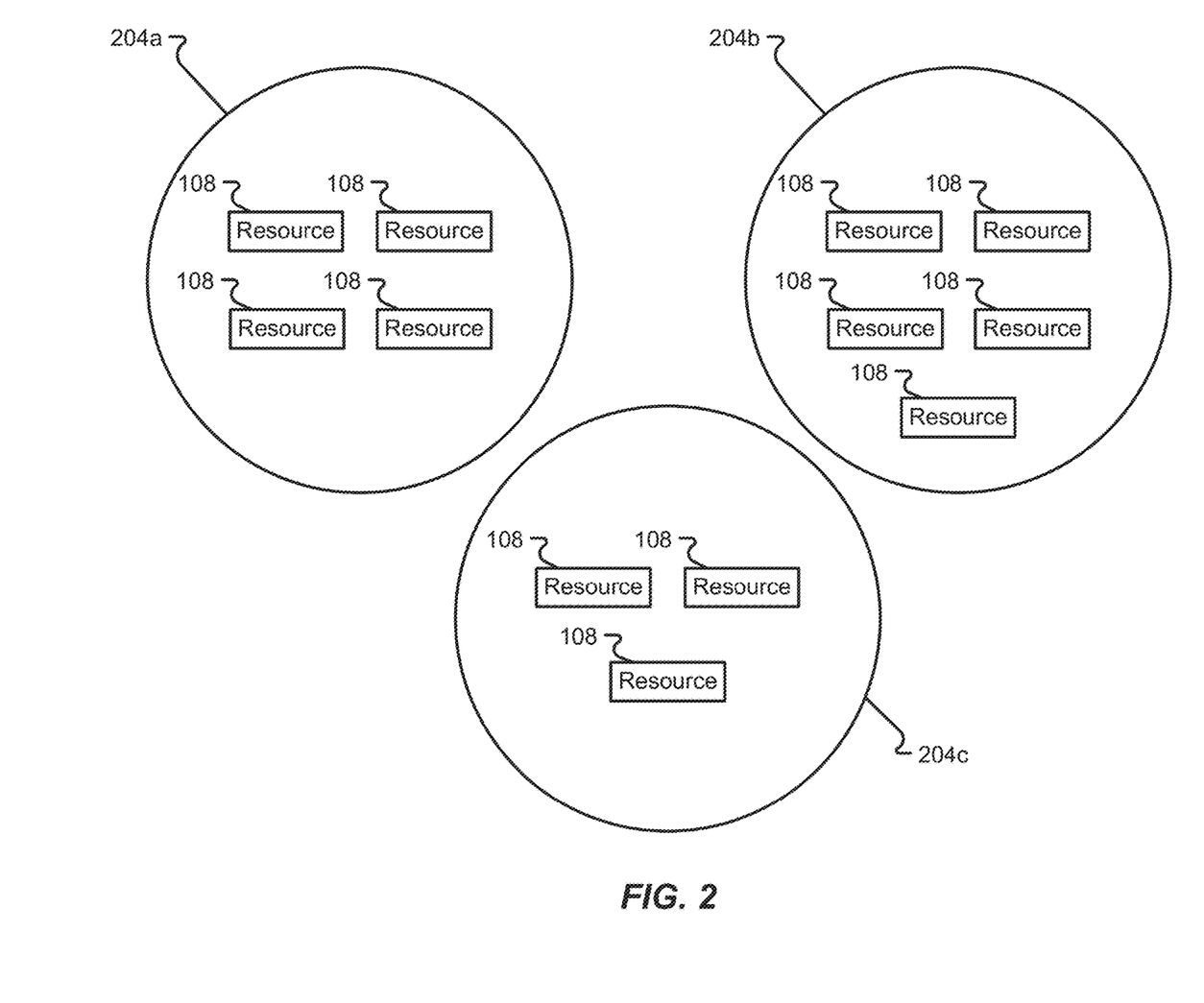
FIG. 2 is a block diagram illustrating pooled resources in accordance with at least some embodiments of the present disclosure.

FIG. 2 illustrates a concept of resource pooling that can be used to facilitate an intelligent allocation of storage 124 among a plurality of resources 108. In the depicted embodiment, resources 108 are organized into pools 204*a*, 204*b*, 204*c*. Although three pools 204*a*, 204*b*, 204*c* of resources 108 are shown in FIG. 2, it should be appreciated that embodiments contemplate a greater or lesser number of pools than depicted and described. The illustration of three pools 204*a*, 204*b*, 204*c* is for case of understanding and discussion and should not be construed as limiting the claims in any way. Additionally, while each pools 204*a*, 204*b*, 204*c* is shown to have at least three resources 108, it should be appreciated that a pool may have one, two, three, four, five, . . . , ten, twenty, or more resources 108 allocated thereto.

In the depicted example, the first pool 204*a* is shown to have four resources 108 allocated thereto, the second pool 204*b* is shown to have five resources 108 allocated thereto, and the third pool 204*c* is shown to have three resources 108 allocated thereto. In some embodiments, each resource 108 may be allocated to only a single pool. In some embodiments, one or more resources 108 may be allocated to two or more pools. In some embodiments, a resource 108 may be allocated to two, three, four, or more pools.

The pools 204*a*, 204*b*, 204*c* may be used as a mechanism for controlling an allocation of storage 124. For instance, the allocation controller 128 may be provided with or have knowledge of the pools 204*a*, 204*b*, 204*c* and which resources 108 are allocated to each pool 204*a*, 204*b*, 204*c*. The allocation controller 128 can use this knowledge of the pools 204*a*, 204*b*, 208*c* and resources 108 allocated thereto as a way of controlling how the storage 124 is allocated among the resources 108.

Figure 3:
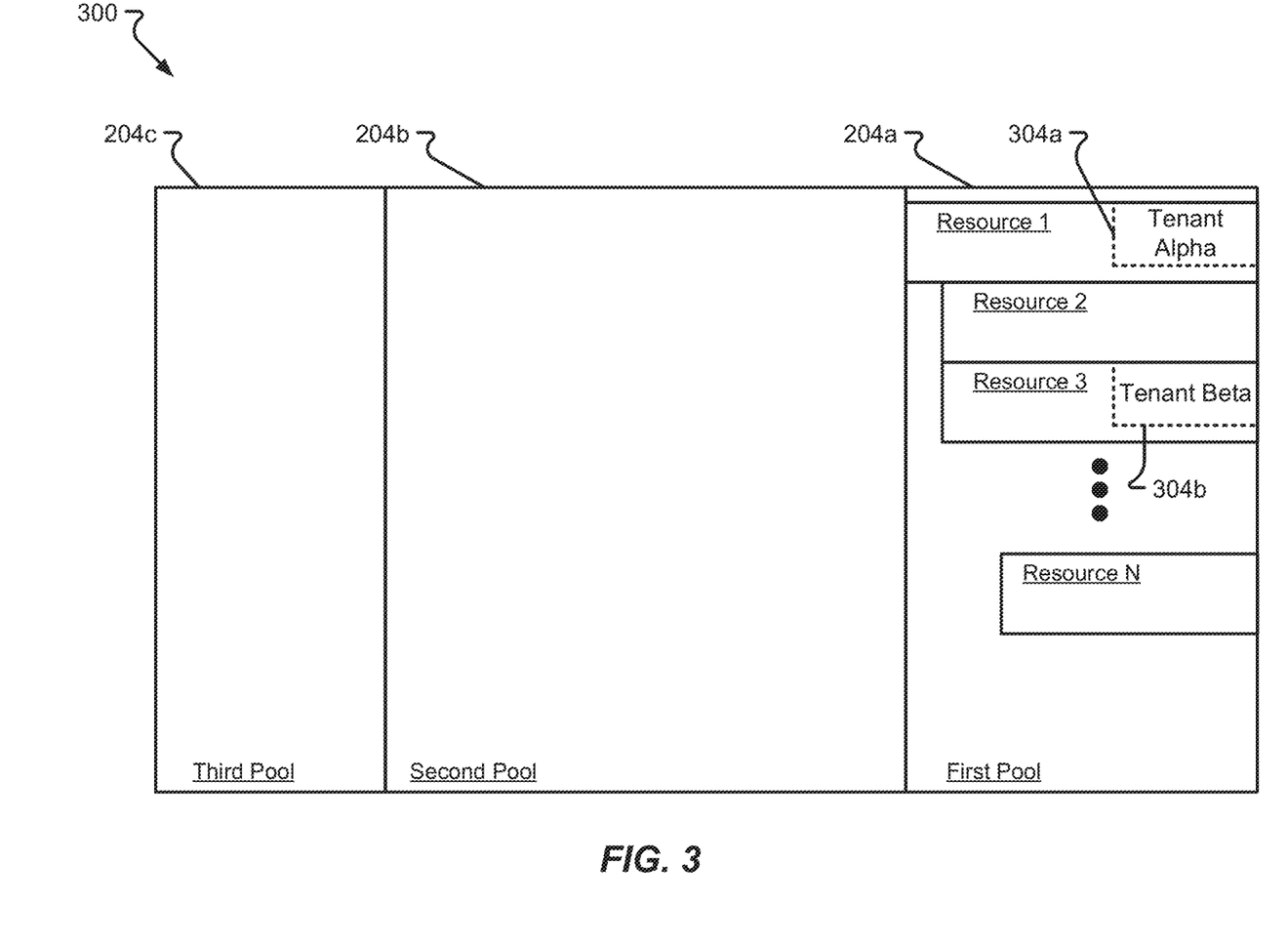
FIG. 3 is a diagram illustrating a shared storage buffer with consumption status indicated at a given time in accordance with at least some embodiments of the present disclosure.

As can be seen in FIG. 3, a shared storage 300, which may be an example of storage 124, may be dividable or shareable among resources 108 using the pools 204*a*, 204*b*, 204*c*. In the illustrated example, the shared storage 300 is configured to be allocated among resources 108 of the first pool 204*a*, the second pool 204*b*, and the third pool 204*c*. In some embodiments, the amount of the shared storage 300 is allocated (or allocatable) to any particular pool 204*a*, 204*b*, 204*c* may be configured. As an example, the pools 204*a*, 204*b*, 204*c* may be configured statically such that each pool can only receive, at most, a fixed amount of storage capacity from the shared storage 300. Continuing the example, it may be possible to configure the first pool 204*a* to receive a maximum of 2 MB of the shared storage 300, the second pool 204*b* to receive 3 MB of the shared storage 300, and the third pool 204*c* to receive 5 MB of the shared storage 300. Of course, two or more pools may be configured to receive a same maximum value of the shared storage 300. It may also be possible to configure allocation of the shared storage 300 to any pool in a dynamic manner (e.g., based on one or more variables or changeable over time) rather than configuring the allocation in a static manner.

Continuing the above example and still with reference to FIG. 3, each resource 108 assigned or allocated to a particular pool 204*a*, 204*b*, 204*c* may also be configured with a maximum allocatable value. In some embodiments, each resource 108 may be configured with a maximum dynamic value (e.g., an "alpha" value), which is 1, meaning that every resource 108 may not receive more than the free resources 108 from the pool in a given time. In some embodiments, a single resource 108 may never receive 100% of the shared storage 300 assigned to the pool. As an example, in the case of alpha=1, the resource 108 may be limited to receiving 50% of the shared storage 300 assigned to the pool because while getting 50% is equal to the unused space of the pool if none of the other pools use the shared storage 300. Said another way, the configured limitation of maximum shared storage 300 available to a pool will also apply to maximizing the amount of shared storage 300 available to a resource 108 within the pool. It some embodiments, it may be possible to configure all resources 108 of a pool with the same maximum dynamic value. In some embodiments, the total maximum dynamic value of all resources 108 belonging to a pool may only add up to 1, meaning that each resource 108 can only receive a proportional amount of the shared storage 300 that is allocatable to the pool.

Continuing the example shown in FIG. 3, further consider that the maximum allocation of the shared storage 300 to a particular resource 108 is 1 MB. In the depicted example, a first consuming entity 304*a* (e.g., tenant Alpha) is configured with a dynamic reservation of the shared storage 300. Specifically, but without limitation, the first consuming entity 304*a* may be allocated a percentage of the current maximum allocation of shared storage 300 made available to the first resource, which would be 0.1 MB. At a future point in time, t, (e.g., where t>Tcurrent), a second or third resource 108 may consume a larger proportion of the first pool 204*a*, thereby reducing the maximum allocation available to the first resource 108, which also impacts the allocation of the shared storage 300 available to the first consuming entity 304*a*. In some embodiments, the first consuming entity 304 may be allocated a percentage or proportional consumption amount of the first resource 108, which has an allocation of the shared storage 300 that depends on the allocation to other resources 108 in the same pool (e.g., the first pool 204*a*). Thus, if a second consuming entity 304*b* (e.g., tenant Beta) begins consuming more of another resource (e.g., the second resource 108) allocated to the same pool (e.g., the first pool 204*a*) as the first resource 108, then the first consuming entity's 304*a* maximum available allocation of the first resource 108 will change dynamically and, possibly proportionately, based on the second consuming entity's 304*b* consumption of the other resource 108 in the same pool.

In some embodiments, it may be possible to allocate a tenant or consuming entity (e.g., the first consuming entity 304*a*) 100% of one or more resources 108 from a pool. As an example, the first consuming entity 304*a* may be allocated 100% of a first resource's 108 bandwidth, 100% of a second resource's 108 bandwidth, and 50% of a third resource's 108 bandwidth. Each of the resources allocated to the first consuming entity 304*a* may belong to a common pool or may be allocated to different pools. Allocation of bandwidth availability for the bandwidth-constrained resource 108 to a particular tenant or consuming entity can be made on a fractional basis and may adjust proportionately based on a consumption of the shared storage 300 from other resources 108 in a pool or from other resources 108 in other pools. In some embodiments, allocation of the shared resource 308 to bandwidth-constrained resources 108 may allow a more efficient and intelligent allocation of bandwidth to tenants or consuming entities vis-à-vis allocation of the shared storage 300 among the pools 204a, 204b, 204c. The allocation controller 128 may be configured to control allocation of the bandwidth on a bandwidth-constrained system by putting a constraint on the shared storage 300, which is not necessarily bandwidth-constrained.

The allocation controller 128 may be configured to measure the constraint on the storage as a percentage, which makes its absolute values dynamic, as the overall shared storage 300 allocation for a resource 108 (e.g., a port or queue) may change over time (e.g., as the port is using a part of the overall shared storage 300 of the whole storage). The effect of the above-described approach allows the allocation controller 128 to assure allocation of bandwidth in a resource 108 (e.g., a port or queue) within a system by allocating a percentage of memory space from the higher-level shared storage 300 entity.

Figure 4:
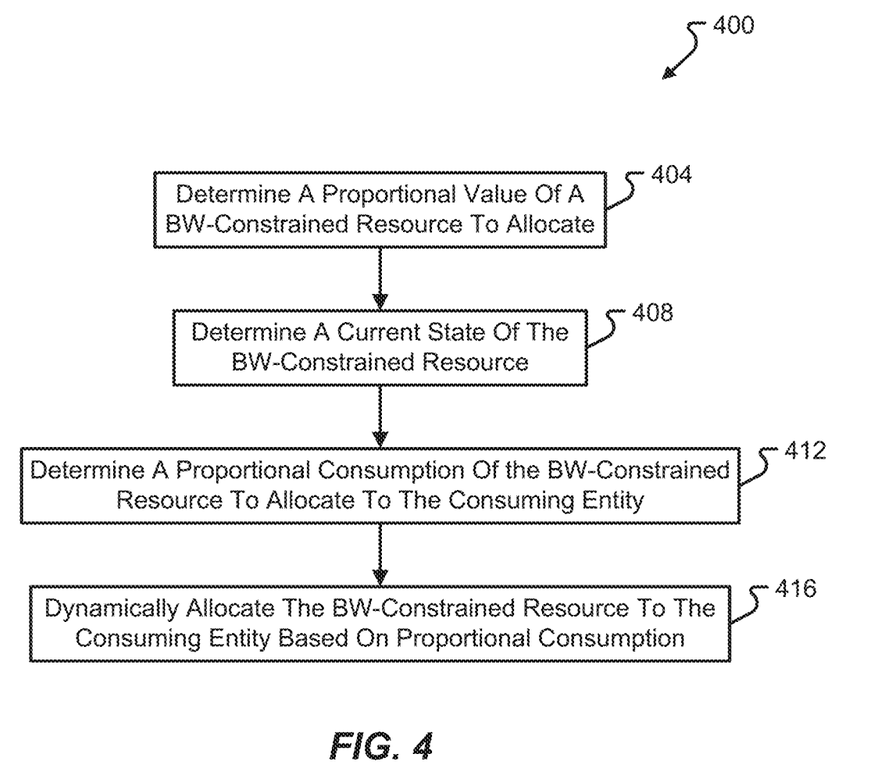
FIG. 4 is a flow diagram illustrating an allocation method in accordance with at least some embodiments of the present disclosure.
Figure 5:
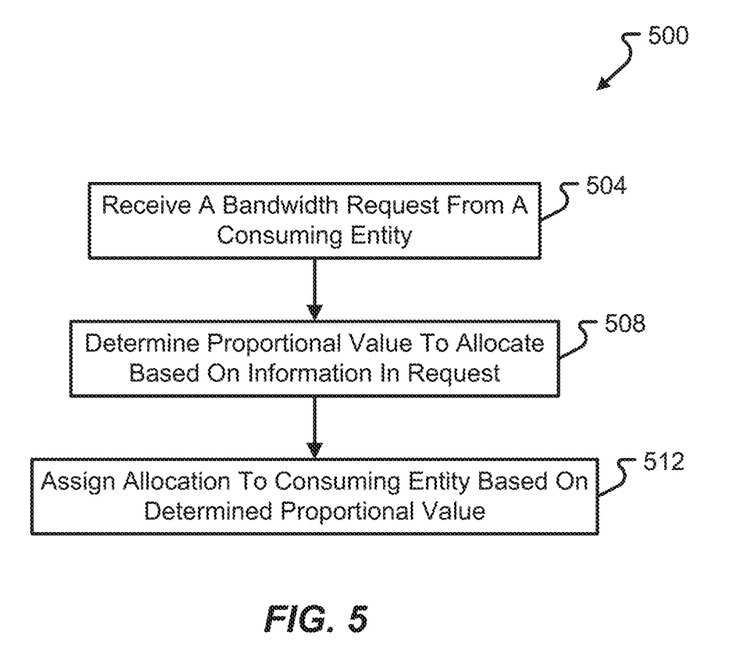
FIG. 5 is a flow diagram illustrating a method of assigning bandwidth allocation to a consuming entity in accordance with at least some embodiments of the present disclosure.
Figure 6:
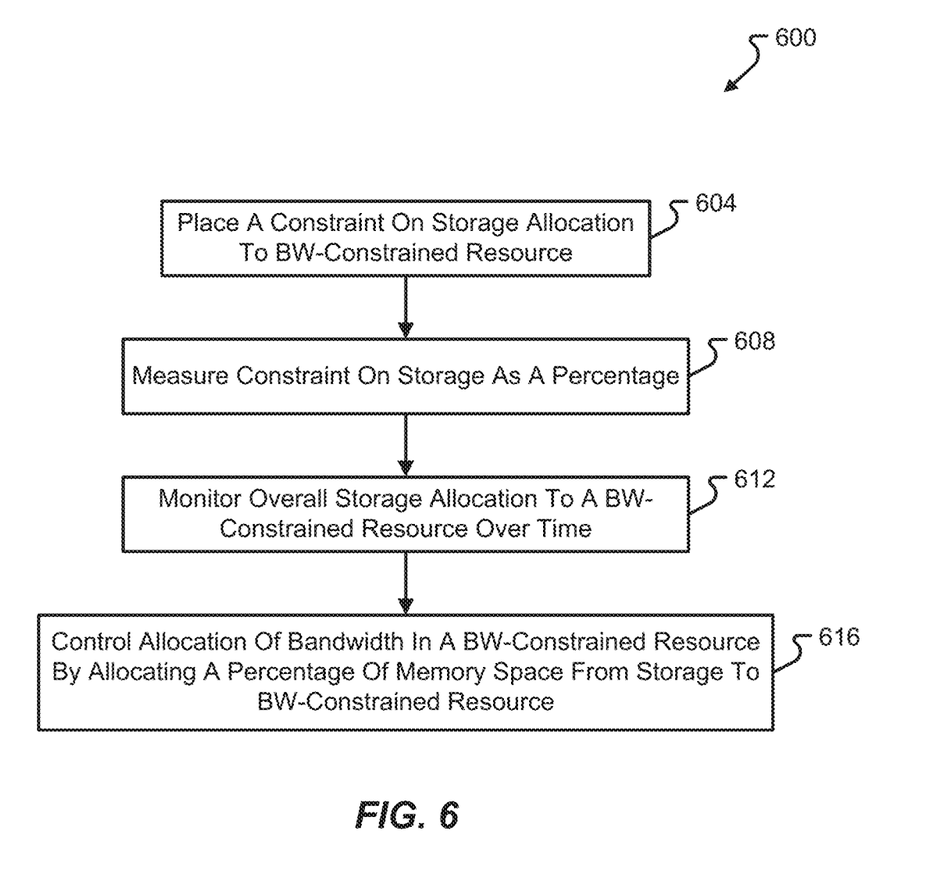
FIG. 6 is a flow diagram illustrating another allocation method in accordance with at least some embodiments of the present disclosure.

Referring now to FIGS. 4-6, various methods will be described in accordance with at least some embodiments of the present disclosure. The disclosed methods will be described in a particular order and/or as being performed by particular components of a system 100, but it should be appreciated that the steps of method(s) may be performed in any suitable order (or in parallel), may be combined with step(s) from other method(s), and/or may be performed by other components described herein.

Referring initially to FIG. 4, an allocation method 400 will be described in accordance with at least some embodiments of the present disclosure. The method 400 begins by determining a proportional value of a bandwidth-constrained resource 108 to allocate to a consuming entity (step 404). The proportional value may be determined based on an allocation or consumption of a shared storage 300 to other resources 108, which may or may not be assigned to a common pool as the bandwidth-constrained resource 108. The determination may also be made by the allocation controller 128 and the determination may continuously or periodically be updated as time progresses.

The method 400 may also include determining a current state of the bandwidth-constrained resource 108 to be allocated to the consuming entity (step 408). The determination made in this step may include determining how much of a maximum available bandwidth is currently being allocated for the bandwidth-constrained resource 108. This determination may also include determining whether any more of a shared storage 300 is available for allocated to the bandwidth-constrained resource 108 or whether the bandwidth-constrained resource 108 has already consumed its maximum allottable amount of the shared storage 300, meaning that the bandwidth-constrained resource 108 cannot gain access to any further memory from the shared storage 300. This may also constitute a cap on the bandwidth that can be allocated by the bandwidth-constrained resource 108. The determination of this step may also include determining how much of another resource in the same pool as the bandwidth-constrained resource 108 is currently receiving allocation of the shared storage 300 and whether the other resource has reached its maximum allocation of the shared storage 300.

The method 400 may then continue by determining a proportional consumption of the bandwidth-constrained resource 108 to allocate to the consuming entity (step 412). The determination of the proportional consumption may depend upon the determined proportional value made in step 404 and/or the determined current state of the bandwidth-constrained resource 108 made in step 408.

The method 400 may then include dynamically allocating the bandwidth-constrained resource 108 to the consuming entity based on the proportional consumption determined in step 412 (step 416). This particular determination may be made by the allocation controller 128 and may be updated periodically or continuously as the consuming entity(ies) continue to consume bandwidth from the bandwidth-constrained resource 108 or other resources that are also consuming memory from the shared storage 300.

Referring now to FIG. 5, a method 500 of assigning bandwidth allocation to a consuming entity will be described in accordance with at least some embodiments of the present disclosure. The method 500 begins when a bandwidth request is received from a consuming entity (step 504). The bandwidth request may be received as part of a formal contract or may be received after an agreement regarding bandwidth availability is made for the consuming entity. The bandwidth request may alternatively or additionally correspond to an increased flow of packets associated with a consuming entity (e.g., increased packet flow resulting in an increase of bandwidth requirements or usage by the consuming entity).

The method 500 may continue with the allocation controller 128 determining a proportional value to allocate to the consuming entity based on the information in the request (step 508). In some embodiments, the consuming entity may be assigned a dynamic reservation of a percentage of bandwidth made available by a resource 108. The method 500 may continue with the allocation controller 128 assigning the consuming entity an amount of a bandwidth-constrained resource 108 based on the determined proportional value (step 512). Alternatively or additionally, the consuming entity may be assigned some percentage of a current maximum allocation of a bandwidth-constrained resource. Thus, as shared storage 300 is devoted to the bandwidth-constrained resource up to the maximum allocation, the consuming entity may receive more bandwidth until the bandwidth-constrained resource has reached is maximum allocation of the shared storage 300.

With reference now to FIG. 6, another allocation method 600 will be described in accordance with at least some embodiments of the present disclosure. The method 600 begins by placing a constraint on storage allocation to be devoted to a bandwidth-constrained resource (step 604). In some embodiments, the allocation controller 128 may constrain allocation of shared storage 300 to the bandwidth-constrained resource based on an amount of shared storage 300 devoted to a pool of resources to which the bandwidth-constrained resource belongs.

The method 600 may continue with the allocation controller 128 measuring a constraint on storage as a percentage (step 608) and monitoring the overall shared storage 300 allocation to the bandwidth-constrained resource over time (step 612). Based on the constraint(s) placed on the bandwidth-constrained resource in step 604, the measurement taken in step 608, and/or the overall shared storage 300 allocated to the bandwidth-constrained resource over time, the allocation controller 128 may control or adjust an allocation of bandwidth in the bandwidth-constrained resource by allocating a percentage of memory space from the shared storage 300 to the bandwidth-constrained resource (step 616). The value may change over time, dynamically, and may adjust based on an amount of the shared storage 300 allocated to other resources in the same pool as the bandwidth-constrained resource. In some embodiments, the shared storage 300 may be allocated to the bandwidth-constrained resource to enable the bandwidth-constrained resource to provide bandwidth to a consuming entity. Such allocations of the shared storage 300 to the bandwidth-constrained resource may be made proportionately, based on other allocations of the shared storage 300 to other resources, and/or based on a maximum allowable amount of shared storage 300 made available to a pool of resources to which the bandwidth-constrained resource belongs.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A networking device, comprising:
    a processor; and
    a computer memory device coupled with the processor, wherein the computer memory device comprises data stored thereon that enables the processor to:
        assign a plurality of resources to a plurality of pools such that a first resource and a second resource are assigned to a first pool; and
        allocate, to the first pool, an amount of storage within a storage device for consumption by the first resource and the second resource,
    wherein a size of the first pool and a current amount of consumption of the amount of storage allocated to the first pool by the first resource are used to dynamically allocate an amount of storage within the storage device that is available to the second resource, the second resource being used to provide bandwidth to a consuming entity.

2. The networking device of claim 1, wherein the second resource comprises a buffer.

3. The networking device of claim 1, wherein the computer memory device comprises data stored thereon that enables the processor to dynamically allocate the amount of the storage available to the second resource.

4. The networking device of claim 1, wherein the computer memory device comprises data stored thereon that enables the processor to dynamically allocate the amount of the storage available to the second resource without allocating a queue.

5. The networking device of claim 1, wherein the second resource comprises a port.

6. The networking device of claim 5, wherein the port belongs to a switch, and wherein the port is shared among a number of consuming entities that include the consuming entity.

7. The networking device of claim 1, wherein an initial amount of storage available to the second resource is preset.

8. The networking device of claim 1, wherein the consuming entity comprises at least one of a network tenant, an application, and a tuple.

9. The networking device of claim 1, wherein the second resource comprises a Graphics Processing Unit (GPU).

10. The networking device of claim 1, wherein the size of the first pool is static.

11. A system, comprising:
    a storage device; and
    a controller configured to:
        assign a plurality of resources to a plurality of pools such that a first resource and a second resource are assigned to a first pool; and
        allocate, to the first pool, an amount of storage within the storage device for consumption by the first resource and the second resource,
    wherein a size of the first pool and a current amount of consumption of the amount of storage allocated to the first pool by the first resource are used to dynamically allocate an amount of storage within the storage device that is available to the second resource, the second resource being used to provide bandwidth to a consuming entity.

12. The system of claim 11, wherein the second resource comprises a buffer.

13. The system of claim 11, wherein the controller is configured to dynamically allocate the amount of the storage available to the second resource.

14. The system of claim 11, wherein the controller is configured to dynamically allocate the amount of the storage available to the second resource without allocating a queue.

15. The system of claim 11, wherein the second resource comprises a port.

16. The system of claim 15, wherein the port belongs to a switch, and wherein the port is shared among a number of consuming entities that include the consuming entity.

17. The system of claim 11, wherein an initial amount of storage available to the second resource is preset.

18. The system of claim 11, wherein the consuming entity comprises at least one of a network tenant, an application, and a tuple.

19. The system of claim 11, wherein the second resource comprises a Graphics Processing Unit (GPU).

20. A method, comprising:
    assigning a plurality of resources to a plurality of pools such that a first resource and a second resource are assigned to a first pool;
    allocating, to the first pool, an amount of storage within a storage device for consumption by the first resource and the second resource; and
    dynamically allocate an amount of storage within the storage device that is available to the second resource based on a size of the first pool and a current amount of consumption of the amount of storage allocated to the first pool by the first resource.

* * * * *